(12) United States Patent
Matsushita et al.

(10) Patent No.: US 8,797,650 B2
(45) Date of Patent: Aug. 5, 2014

(54) VARIABLE WAVELENGTH INTERFERENCE FILTER, OPTICAL MODULE, AND OPTICAL ANALYSIS DEVICE

(75) Inventors: Tomonori Matsushita, Chino (JP); Yasushi Matsuno, Matsumoto (JP)

(73) Assignee: Seiko Epson Corporation (JP)

( * ) Notice: Subject to any disclaimer, the term of this patent is extended or adjusted under 35 U.S.C. 154(b) by 407 days.

(21) Appl. No.: 13/313,661

(22) Filed: Dec. 7, 2011

(65) Prior Publication Data
US 2012/0147380 A1 Jun. 14, 2012

(30) Foreign Application Priority Data
Dec. 8, 2010 (JP) .................. 2010-273264

(51) Int. Cl.
*G02B 27/00* (2006.01)

(52) U.S. Cl.
USPC ........................................ 359/579; 356/454

(58) Field of Classification Search
USPC .......... 356/454, 519; 359/578, 579, 582, 585, 359/589
See application file for complete search history.

(56) References Cited

U.S. PATENT DOCUMENTS

| | | | | |
|---|---|---|---|---|
| 5,142,414 A | * | 8/1992 | Koehler | 359/578 |
| 7,190,523 B2 | * | 3/2007 | Yoda | 359/579 |
| 7,301,703 B2 | * | 11/2007 | Nakamura et al. | 359/578 |
| 7,304,800 B2 | * | 12/2007 | Nakamura et al. | 359/579 |
| 2010/0226029 A1 | | 9/2010 | Funasaka | |

FOREIGN PATENT DOCUMENTS

JP 2010-204457 9/2010

* cited by examiner

*Primary Examiner* — Jonathan Hansen
(74) *Attorney, Agent, or Firm* — Harness, Dickey & Pierce, P.L.C.

(57) ABSTRACT

A wavelength-variable interference filter includes first and second electrodes provided at first and second substrates, respectively, the second substrate including a movable section, first and second electrode wires that extend from the first and second electrodes toward outer circumferential edges of the first and second substrates, respectively, a first opposite electrode wire disposed so as to be isolated from the second electrode, and a first conductive section that connects the first electrode wire with the first opposite electrode wire. The second electrode wire and the first opposite electrode wire extend passing through a center point of an imaginary circle of the movable section in respective directions and dividing the imaginary circle at regular angular intervals.

12 Claims, 7 Drawing Sheets

VARIABLE WAVELENGTH INTERFERENCE FILTER, OPTICAL MODULE, AND OPTICAL ANALYSIS DEVICE

BACKGROUND

The entire disclosure of Japanese Patent Application No. 2010-273264, filed Dec. 8, 2010, is expressly incorporated by reference herein.

1. Technical Field

The present invention relates to a wavelength-variable interference filter, an optical module equipped with the wavelength-variable interference filter, and an optical analysis device equipped with the optical module.

2. Related Art

In the past, there has been known an optical filter (a wavelength-variable interference filter) having mirrors disposed in an opposite manner on the respective surfaces of a pair of substrates, the surfaces being opposite to each other. See Japanese patent publication number JP-A-2010-204457. In such a wavelength-variable interference filter, multiple interference is caused in the incident light between the pair of mirrors. And then the light with a specific wavelength reinforced each other by the multiple interference is transmitted therethrough.

In the wavelength-variable interference filter of the above Japanese patent publication, a first substrate and a second substrate are disposed so as to be opposite to each other. Further, on the surface of the first substrate not opposite to the second substrate, a groove section having an annular shape is formed. And by forming the groove section, a columnar movable section is formed at the central part of the first substrate; and a diaphragm is formed to have an annular shape coaxial with the movable section. Further, between the pair of substrates, ring-like electrodes are provided respectively on the surface of the diaphragm, the surface being opposite to the second substrate, and on the second substrate so as to be opposite to each other; and further, mirrors are provided respectively on a surface of the movable section, the surface being opposite to the second substrate, and on the second substrate so as to be opposite to each other.

According to such a configuration, by applying voltages to electrode wires respectively extending from the pair of electrodes to the outer circumferential edges of the substrates, an electrostatic attractive force is generated between the pair of electrodes. The diaphragm is bent due to the electrostatic force to thereby displace the movable section provided with the mirror in the substrate thickness direction. And thus, it becomes possible to vary a gap between the pair of mirrors. Therefore, it becomes possible for the wavelength-variable interference filter to transmit the light with the specific wavelength corresponding to the gap.

In the wavelength-variable interference filter of the above Japanese patent publication, in the first substrate, the surface of the diaphragm opposite to the second substrate is provided with the electrode wire extending from the electrode to the outer circumferential edge of the substrate. Since the just one electrode wire is provided to the first substrate, the film stress of the electrode wire is applied only to a part provided with the electrode wire out of the diaphragm. Therefore, there is a possibility that the stress balance of the diaphragm becomes uneven to thereby cause deflection of the diaphragm. Thus, there is a possibility that the movable section of the first substrate is tilted, and the pair of mirrors fails to be parallel to each other.

Therefore, in order for improving the stress balance of the diaphragm in the first substrate, it is possible to form an electrode wire (an anti-deflection electrode wire) having the same configuration at a position symmetrical to the electrode wire described above taking the center point of the substrate as the center point of symmetry.

However, in some cases, there is no choice but to dispose the electrode wire at a position of the second substrate, the position being opposite to the anti-deflection electrode wire, due to the structural restriction such as the wiring condition of a module for incorporating the wavelength-variable interference filter. In such cases, since the electrostatic attractive force is generated between the anti-deflection electrode wire and the electrode wire of the second substrate, there is a possibility that the pair of mirrors fails to be parallel to each other. Thus, there arises a problem that it is not achievable to accurately set the gap between the pair of mirrors to a desired amount of gap.

SUMMARY

An advantage of some aspects of the invention is to provide a wavelength-variable interference filter, an optical module, and an optical analysis device capable of accurately setting the gap to a desired amount.

An aspect of the invention is directed to a wavelength-variable interference filter including a first substrate, a second substrate that is opposite to the first substrate and that has a movable section moving back and forth toward the first substrate, a first reflecting film that is provided at a first surface of the first substrate and the first surface is opposite to the second substrate, a second reflecting film that is provided at a second surface of the movable section, the second surface is opposite to the first substrate, and the second reflecting film is opposite to the first reflecting film via a predetermined first gap, a first electrode that is provided at a third surface of the first substrate and the third surface is opposite to the second substrate, a second electrode that is provided at a fourth surface of the second substrate, the fourth surface is opposite to the first substrate, and the second electrode is opposite to the first electrode via a predetermined second gap, a first electrode wire that is provided at the first substrate so as to extend from the first electrode toward an outer circumferential edge of the first substrate, a second electrode wire that is provided at the second substrate so as to extend from the second electrode toward an outer circumferential edge of the second substrate, a first opposite electrode wire that is provided at the second substrate, that is opposite to the first electrode wire, and that is isolated from the second electrode, and a first conductive section adapted to electrically connect the first electrode wire with the first opposite electrode wire, wherein the second electrode wire and the first opposite electrode wire extend in respective directions that pass through a center point of an imaginary circle centered on the center point of the movable section in a plan view viewed from a first thickness direction of the second substrate and that divide the imaginary circle at regular angular intervals.

According to this aspect of the invention, the second substrate having the movable section moving back and force toward the first substrate is provided with the second electrode wire disposed so as to extend from the second electrode to the outer circumferential edge of the second substrate, and the first opposite electrode wire disposed so as to be opposite to the first electrode wire, and to be isolated from the second electrode. Further, the second electrode wire and the first opposite electrode wire are formed so as to extend passing through the center point of the imaginary circle centered on the center point of the movable section in a plan view in the respective directions dividing the imaginary circle at regular angular intervals.

In the case in which, for example, the second electrode wire and the first opposite electrode wire are formed at intervals of 180 degrees, it results that the second electrode wire and the first opposite electrode wire are disposed so as to be point-symmetric with respect to the center point of the movable section, and in the case in which the second electrode wire and the first opposite electrode wire are formed at intervals of 90 degrees, it results that the second electrode wire and the first opposite electrode wire are disposed so as to be axisymmetric with respect to the symmetric axis passing through the center point of the movable section.

Thus, the stress balance of the second substrate is kept even due to the second electrode wire and the first opposite electrode wire, and as described above, the movable section of the second substrate can be prevented from being tilted due to the film stress in the case of depositing only the second electrode wire on the second substrate, and thus the pair of reflecting films can be kept parallel to each other.

Further, the first electrode wire and the first opposite electrode wire opposite to each other are electrically connected to each other with the first conductive section. Thus, since the electrical potential difference between the first electrode wire and the first opposite electrode wire becomes zero, the electrostatic attractive force can be prevented from being generated between the first electrode wire and the first opposite electrode wire, and thus, it is possible to generate the electrostatic attractive force only between the first electrode and the second electrode.

Therefore, the pair of reflecting films can be kept parallel to each other, and thus the gap therebetween can accurately be set to the desired gap.

In the wavelength-variable interference filter of the above aspect of the invention, it is preferable that the second substrate has a connection holding section adapted to hold the movable section movably in the first thickness direction of the second substrate, the second electrode wire and the first opposite electrode wire are partially formed on the connection holding section, and formation areas in which the second electrode wire and the first opposite electrode wire are partially formed have substantially the same shapes.

Incidentally, the connection holding section is a part for holding the movable section so as to be able to move in the first thickness direction of the second substrate, and is therefore formed to be easily deflected.

According to this configuration, the formation areas in which the second electrode wire and the first opposite electrode wire are formed in the connection holding section have the same shape. Thus, since the stress balance of the connection holding section is kept even in the second substrate, the movable section can surely be prevented from being tilted due to the film stress in the case of depositing only the second electrode wire on the connection holding section, and thus the pair of reflecting films can be kept parallel to each other.

In the wavelength-variable interference filter of the above aspect of the invention, it is preferable that there are further provided a second opposite electrode wire that is provided at the first substrate, that is opposite to the second electrode wire, and that is isolated from the first electrode, and a second conductive section adapted to electrically connect the second electrode wire with the second opposite electrode wire, and the first electrode wire and the second opposite electrode wire extend in the respective directions that pass through the center point of the imaginary circle centered on the center point of the first reflecting film in the plan view viewed from a second thickness direction of the first substrate and that divide the imaginary circle at regular angular intervals.

Incidentally, in the case in which the thickness dimension of the first substrate is small, the first substrate is deflected due to the film stress of the first electrode wire to thereby prevent the formation surface of the first reflecting film from becoming horizontal, and there is a possibility that the pair of reflecting films fail to be kept parallel to each other.

Therefore, according to this configuration, on the first substrate, there are formed the first electrode wire and the second opposite electrode wire so as to extend passing through the center point of the imaginary circle centered on the center point of the first reflecting film in the plan view in the respective directions dividing the imaginary circle at regular angular intervals. Thus, the deflection caused in the first substrate by the film stress in the case of depositing only the first electrode wire can be prevented, and the pair of reflecting films can be kept more highly parallel to each other.

Further, the second electrode wire and the second opposite electrode wire opposite to each other are electrically connected to each other with the second conductive section. Thus, since the electrical potential difference between the second electrode wire and the second opposite electrode wire becomes zero, the electrostatic attractive force can be prevented from being generated between the second electrode wire and the second opposite electrode wire, and thus, it is possible to generate the electrostatic attractive force only between the first electrode and the second electrode. Therefore, the pair of reflecting films can be kept more highly parallel to each other, and thus the gap therebetween can accurately be set to the desired gap.

Another aspect of the invention is directed to an optical module including the wavelength-variable interference filter according to any one of the aspects of the invention described above, and a light receiving section adapted to receive test target light transmitted through the wavelength-variable interference filter.

According to this aspect of the invention, similarly to the aspects of the invention described above, since the pair of reflecting films can be kept more highly parallel to each other, the wavelength-variable interference filter can accurately be set to have a desired gap corresponding to the applied voltage. Therefore, the optical module is capable of performing measurement with high accuracy using the light receiving section.

Still another aspect of the invention is directed to an optical analysis device including an optical module of the above aspect of the invention, and an analysis processing section adapted to analyze optical characteristics of the test target light based on the light received by the light receiving section of the optical module.

According to this aspect of the invention, since the optical module having the wavelength-variable interference filter described above is provided, there can be realized an optical analysis device capable of performing measurement with high accuracy, and measuring accurate spectral characteristics by performing the optical analysis processing based on the measurement result.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An embodiment of the invention will hereinafter be explained with reference to the accompanying drawings.

1. Schematic Configuration of Colorimetric Device

Figure 1:
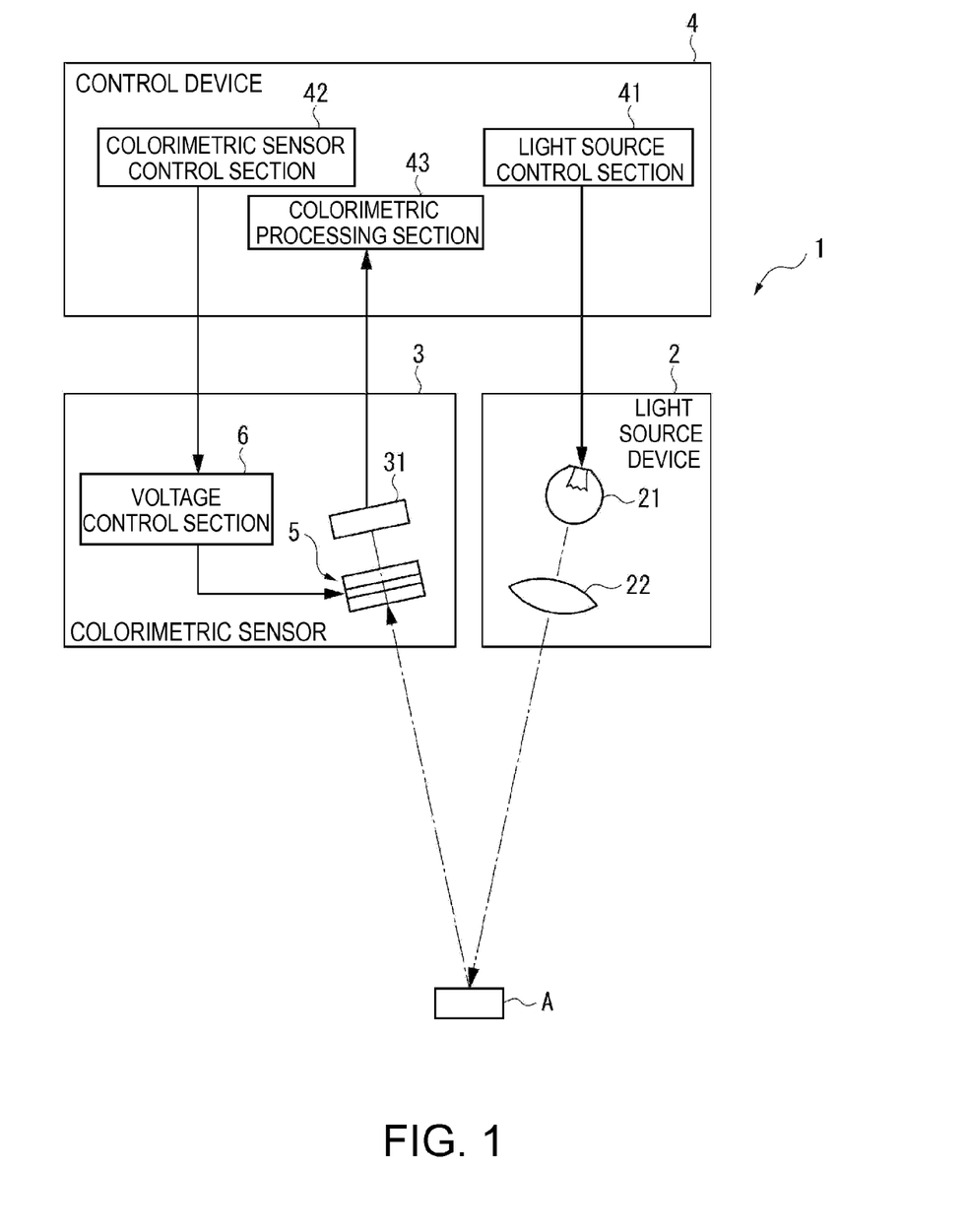
FIG. 1 is a block diagram showing a schematic configuration of a colorimetric device according to an embodiment of the invention.

FIG. 1 is a block diagram showing a schematic configuration of a colorimetric device 1 (an optical analysis device) according to an embodiment of the invention.

As shown in FIG. 1, the colorimetric device 1 is provided with a light source device 2 for emitting light to a test object A, a colorimetric sensor 3 (an optical module), and a control device 4 for controlling an overall operation of the colorimetric device 1. Further, the colorimetric device 1 is a device for making the light, which is emitted from the light source device 2, be reflected by the test object A, receiving the test target light thus reflected using the colorimetric sensor 3, and analyzing and then measuring the chromaticity of the test target light, namely the color of the test object A, based on the detection signal output from the colorimetric sensor 3.

2. Configuration of Light Source Device

The light source device 2 is provided with a light source 21 and a plurality of lenses 22 (one of the lenses is shown alone in FIG. 1), and emits white light to the test object A. Further, it is possible for the plurality of lenses 22 to include a collimator lens. And in this case, the light source device 2 converts the white light emitted from the light source 21 into parallel light with the collimator lens, and emits it from the projection lens not shown toward the test object A. It should be noted that although in the present embodiment the colorimetric device 1 provided with the light source device 2 is described as an example. If the test object A is a light emitting member such as a liquid crystal panel, it is also possible to adopt the configuration not provided with the light source device 2.

3. Configuration of Colorimetric Sensor

As shown in FIG. 1, the colorimetric sensor 3 is provided with an etalon 5 (a wavelength-variable interference filter), a light receiving element 31 (a light receiving section) for receiving the light transmitted through the etalon 5, and a voltage control section 6 for varying the wavelength of the light to be transmitted through the etalon 5. Further, the calorimetric sensor 3 is provided with an entrance optical lens not shown disposed at a position opposite to the etalon 5. The entrance optical lens guide the reflected light (the test target light) reflected by the test object A into the inside thereof. Further, the colorimetric sensor 3 disperses the light with a predetermined wavelength out of the test target light entering from the entrance optical lens using the etalon 5. And the receiving element 31 receives the dispersed light.

The light receiving element 31 is composed of a plurality of photoelectric conversion elements and generates an electric signal corresponding to the received light intensity. Further, the light receiving element 31 is connected to the control device 4 and outputs the electric signal thus generated to the control device 4 as a light reception signal.

3-1. Configuration of Etalon

Figure 2:
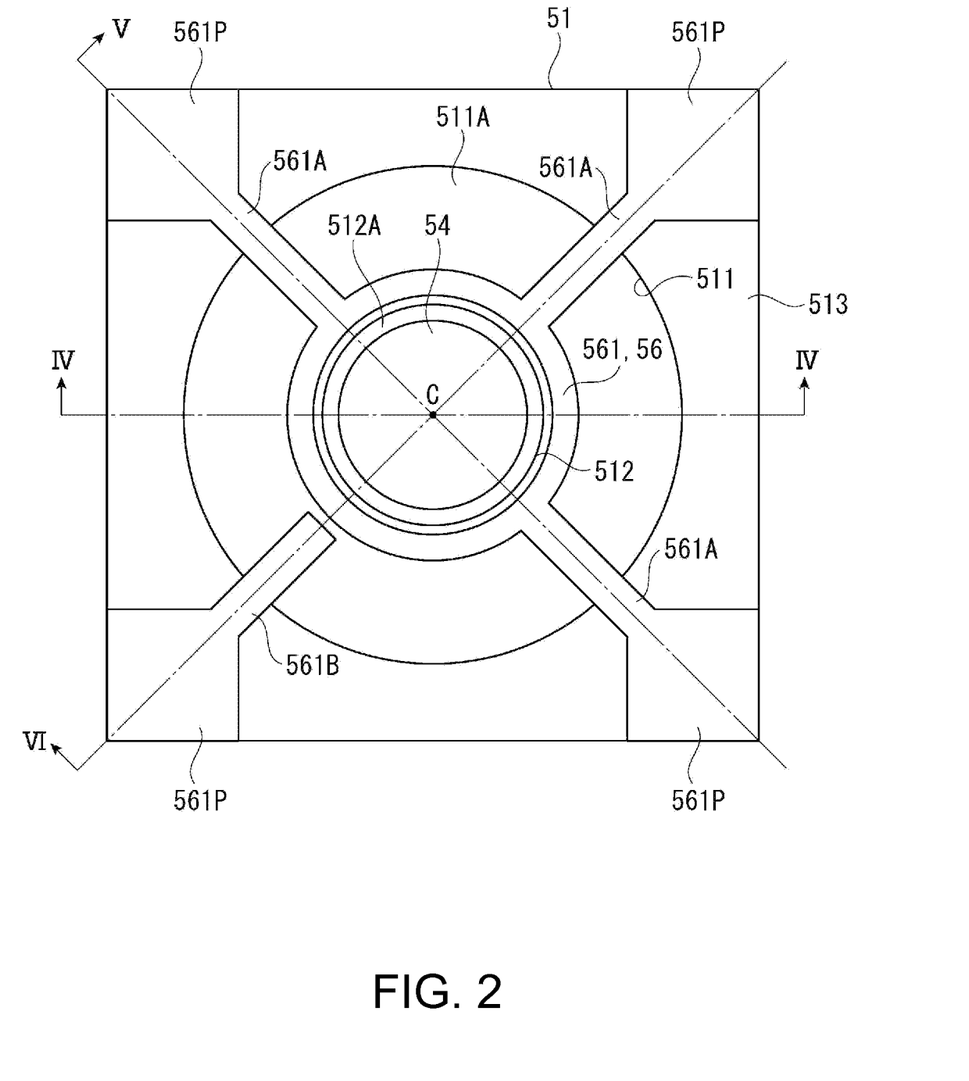
FIG. 2 is a plan view of a first substrate of an etalon of an embodiment.
Figure 3:
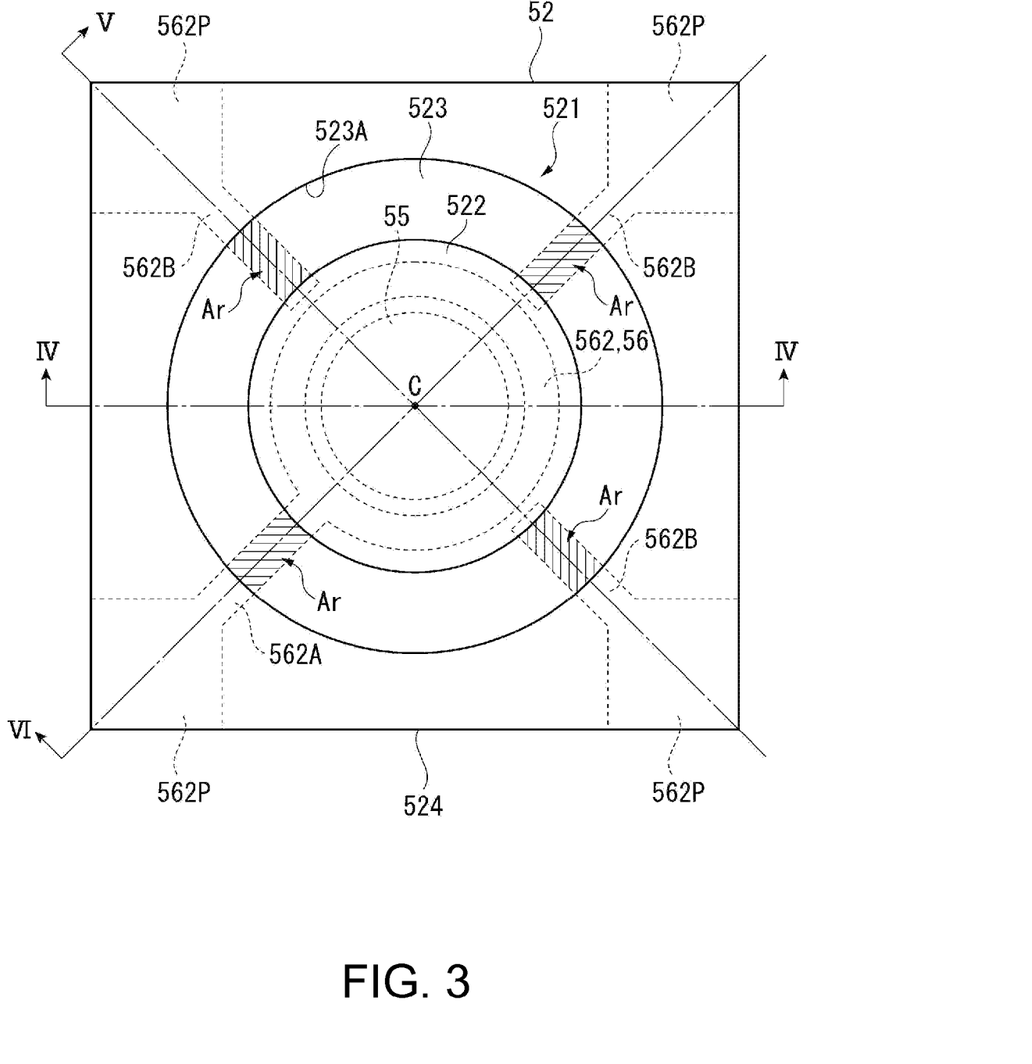
FIG. 3 is a plan view of a second substrate of an etalon of an embodiment.
Figure 4:
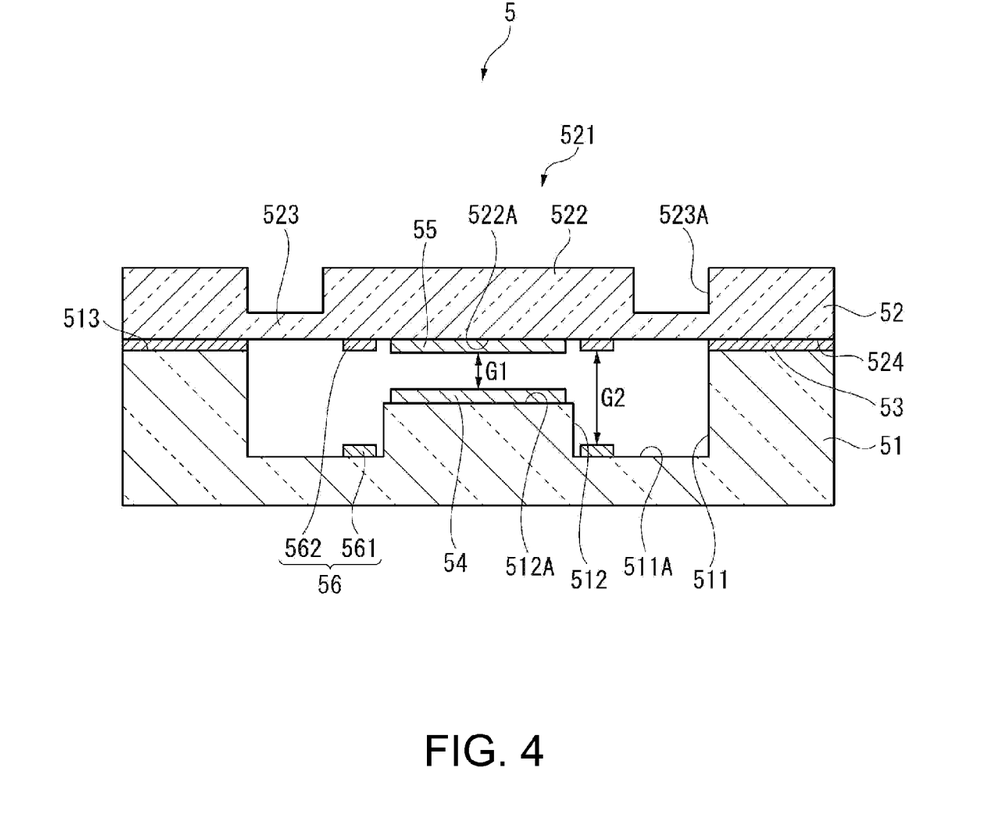
FIG. 4 is a cross-sectional view of an etalon of an embodiment.

FIG. 2 is a plan view of a first substrate 51 of the etalon 5. And FIG. 3 is a plan view of a second substrate 52 of the etalon 5. FIG. 4 is a cross-sectional view of the etalon 5 at a position indicated by the arrowed line IV-IV shown in FIGS. 2 and 3. It should be noted that although the test target light enters the etalon 5 from the lower side of the drawing as shown in FIG. 1, it is assumed that the test target light enters the etalon 5 from the upper side of the drawing as shown in FIG. 4.

As shown in FIGS. 2 and 3, the first substrate 51 and the second substrate 52 are each a plate-like optical member having a square planar shape in which a length of one side is 10 mm. As shown in FIG. 4, the etalon 5 is provided with the second substrate 52 and the first substrate 51 disposed in this order from the entrance side of the test target light. And these substrates 51, 52 are bonded to each other via a bonding layer 53 by the siloxane bond using a plasma-polymerized film to thereby be integrally configured. These two substrates 51, 52 are each made of glass of various types such as soda glass, crystalline glass, quartz glass, lead glass, potassium glass, borosilicate glass, or alkali-free glass, or quartz crystal, for example.

Further, as shown in FIG. 4, between the first substrate 51 and the second substrate 52, there are a stationary mirror 54 (a first reflecting film) and a movable mirror 55 (a second reflecting film). Here, the stationary mirror 54 is provided to a surface of the first substrate 51, the surface being opposite to the second substrate 52. And the movable mirror 55 is provided to a surface of the second substrate 52, the surface being opposite to the first substrate 51. Further, the stationary mirror 54 and the movable mirror 55 are disposed so as to be opposite to each other via an inter-mirror gap G1 (a first gap).

Further, between the first substrate 51 and the second substrate 52, there is an electrostatic actuator 56 for controlling the dimension of the inter-mirror gap G1 between the respective mirrors 54, 55.

3-1-1. Configuration of First Substrate

The first substrate 51 is formed by processing a glass substrate having a thickness of, for example, 500 μm using an etching process. As shown in FIGS. 2 and 4, the first substrate 51 is provided with an electrode formation groove 511 and a mirror fixation section 512 using the etching process.

The electrode formation groove 511 is provided with an electrode fixation surface 511A having a ring-like shape formed between the outer circumferential edge of the mirror fixation section 512 and the inner circumferential wall surface of the electrode formation groove 511. And the electrode fixation surface 511A is provided with a first electrode 561. An imaginary circle centered on the center point C of the stationary mirror 54 corresponds to the first electrode 561 having a ring-like shape.

It should be noted that the first electrode 561 is not particularly limited providing it has a conductive property. And the first electrode 561 can be made to generate an electrostatic attractive force between the first and second electrodes 561, 562 by applying a voltage between the first electrode 561 and the second electrode 562 of the second substrate 53 as described later. Although in the present embodiment indium tin oxide (ITO) is used as the first electrode 561, a metal layered body made of Au/Cr can also be used. Further, although not shown in the drawings, an insulating film is formed on the upper surface of the first electrode 561 in order for preventing leakage due to the discharge between the first and second electrodes 561, 562. As the material of the insulating film, SiO$_2$ and tetraethoxysilane (TEOS) can be used, and in particular, SiO$_2$ having the same optical characteristics as the glass substrate forming the first substrate 51 is preferable. In the case of using SiO$_2$ as the insulating layer, since the reflection of the light between the first substrate 51 and the insulating film does not occur, the insulating film can be formed on the entire surface of the first substrate 51 on the side thereof opposite to the second substrate 52 after forming the first electrode 561 on the first substrate 51.

As shown in FIG. 2, the mirror fixation section 512 is formed to have a roughly circular shape coaxial with the electrode formation groove 511 and have a redial dimension smaller than that of the electrode formation groove 511. And the mirror fixation section 512 is provided with a mirror fixation surface 512A disposed on a surface thereof opposite to the second substrate 52.

Further, the stationary mirror 54 formed of a TiO$_2$-SiO$_2$ type dielectric multilayer film so as to have a circular shape with a diameter of about 3 mm is fixed to the mirror fixation surface 512A. It should be noted that although in the present embodiment a mirror made of the TiO$_2$-SiO$_2$ type dielectric multilayer film is used as the stationary mirror 54, it is also possible to adopt a configuration of using an Ag alloy monolayer mirror capable of covering the entire visible range as a wavelength range to be dispersed into a spectrum.

In the plan view shown in FIG. 2, three first electrode wires 561A are formed so as to extend from respective parts of the outer circumferential edge of the first electrode 561 toward the upper left direction, the upper right direction, and the lower right direction along the diagonal lines of the first substrate 51.

Further, in the plan view shown in FIG. 2, a single second opposite electrode wire 561B is formed so as to be isolated from the first electrode 561 and extend from a position separate from the outer circumferential edge of the first electrode 561 toward the lower left direction along the diagonal line of the first substrate 51.

Further, at the tip of each of the first electrode wires 561A and the second opposite electrode wire 561B, a first electrode pad 561P is formed. And the first electrode pads 561P are connected to the voltage control section 6 (see FIG. 1). Further, when driving the electrostatic actuator 56, the voltage control section 6 (see FIG. 1) applies a voltage to the first electrode pads 561P.

As described above, because the three first electrode wires 561 and the single second opposite electrode wire 561B are formed along the diagonal lines of the first substrate 51, they are formed at regular angular intervals (at intervals of 90 degrees) in the circumferential direction of the first electrode 561. In other words, the three first electrode wires 561A and the single second opposite electrode wire 561B are formed so as to be point-symmetric with respect to the center point C (the substrate center point of the first substrate 51) of the stationary mirror 54 in the plan view along the thickness direction of the first substrate 51 (hereinafter referred to as an etalon plan view). Thus, the film stress caused by forming the first electrode wires 561A and the second opposite electrode wire 561B on the first substrate 51 by deposition is reduced throughout the surface of the first substrate 51. And the tilt of the mirror fixation surface 512A is prevented.

Here, in the first substrate 51, the part provided with neither the electrode formation groove 511 nor the mirror fixation section 512 becomes a bonding surface 513 of the first substrate 51. As shown in FIG. 4, the bonding surface 513 is provided with a bonding layer 53 used for bonding. As the bonding layer 53, a plasma-polymerized film with polyorganosiloxane used as a primary material can be used.

3-1-2. Configuration of Second Substrate

The second substrate 52 is formed by processing a glass substrate having a thickness of 200 μm using an etching process. The second substrate 52 is provided with a circular displacement section 521 centered on the substrate center point in a plan view. As shown in FIGS. 3 and 4, the displacement section 521 is provided with a connection holding section 523, which is coaxial with the movable section 522 having a columnar shape and moving back and forth with respect to the first substrate 51. And the connection holding section 523 is formed to have an annular shape in the etalon plan view so as to hold the movable section 522 movably in the thickness direction of the second substrate 52.

The displacement section 521 is formed by providing a groove to the second substrate 52 using an etching process on the plate-like glass substrate as the constituent material of the second substrate 52. In other words, the displacement section 521 is provided to the incident side surface of the second substrate 52, the surface being not opposite to the first substrate 51, by forming an annular groove section 523A having an annular shape for forming the connection holding section 523 using an etching process.

The movable section 522 is formed to have a thickness dimension larger than that of the connection holding section 523. And the movable section 522 is formed in the present embodiment to have the thickness dimension of 200 μm, which is the same as the thickness dimension of the second substrate 52. The movable section 522 is formed to have a radial dimension larger than the radial dimension of the mirror fixation section 512 of the first substrate 51.

The surface of the movable section 522, the surface being opposite to the first substrate 51, is provided with a movable surface 522A parallel to the mirror fixation surface 512A of the first substrate 51. And the movable surface 522A is provided with a movable mirror 55 having the same configuration as that of the stationary mirror 54 and with the second electrode 562 formed to have a ring-like shape, having the same configuration as that of the first electrode 561, and opposite to the first electrode 561 via a predetermined second gap G2. An imaginary circle centered on the center point C of the movable section 522 corresponds to the second electrode 562 having a ring-like shape.

The connection holding section 523 is a diaphragm surrounding the periphery of the movable section 522. And the connection holding section 523 is formed to have a thickness dimension of 50 μm.

In the etalon plan view shown in FIG. 3, a single second electrode wire 562A is formed so as to extend from a part of the outer circumferential edge of the second electrode 562 toward the lower left direction along the diagonal line of the second substrate 52 straddling the connection holding section 523. In other words, a formation area Ar is an area (a hatched part shown in FIG. 3) where the second electrode wire 562A is formed in the connection holding section 523.

Further, in the etalon plan view shown in FIG. 3, three first opposite electrode wires 562B are formed so as to be isolated from the second electrode 562 and extend from respective positions separate from the outer circumferential edge of the second electrode 562 radially in three directions, namely toward the upper left direction, the upper right direction, and the lower right direction along the diagonal lines of the second substrate 52. In other words, the formation areas Ar are also areas (hatched parts shown in FIG. 3) where each of the first opposite electrode wires 562B is formed in the connection holding section 523.

In the formation area Ar, the first opposite electrode wires 562B and the second electrode wire 562A are formed to have the same shape equal in length dimensions, width dimensions, and thickness dimensions.

Further, because the single second electrode wire 562A and the three first opposite electrode wires 562B are formed along the diagonal lines of the second substrate 52, they are formed at regular angular intervals (at intervals of 90 degrees) in the circumferential direction of the second electrode 562. In other words, the single second electrode wire 562A and the three first opposite electrode wires 562B are formed so as to be point-symmetric with respect to the center point C (the substrate center point of the second substrate 52) of the movable section 522 in the etalon plan view.

As described above, since the second electrode wire 562A and the first opposite electrode wires 562B are formed in the formation areas Ar of the connection holding section 523 so as to have the same shape, the stress balance of the connection holding section 523 due to the film stress of the second electrode wire 562A and the first opposite electrode wires 562B becomes even. Thus, it can be prevented that the movable section 522 is tilted due to the film stress caused in the connection holding section 523. And the movable surface 522A and the mirror fixation surface 512A become parallel to each other.

At the tip of each of the second electrode wire 562A and the first opposite electrode wires 562B, a second electrode pad 562P is formed. And the second electrode pads 562P are connected to the voltage control section 6 (see FIG. 1). Further, when driving the electrostatic actuator 56, the voltage control section 6 (see FIG. 1) applies a voltage to the second electrode pads 562P.

Here, in the surface of the second substrate 52, the surface being opposite to the first substrate 51, i.e. the area opposite to the bonding surface 513 of the first substrate 51, becomes a bonding surface 524 in the second substrate 52. The bonding surface 524 is provided with the bonding layer 53 using polyorganosiloxane as a primary material in the same manner of the bonding surface 513 of the first substrate 51.

3-1-3. Conducting Structure Between Electrode Wire and Opposite Electrode Wire

Figure 5:
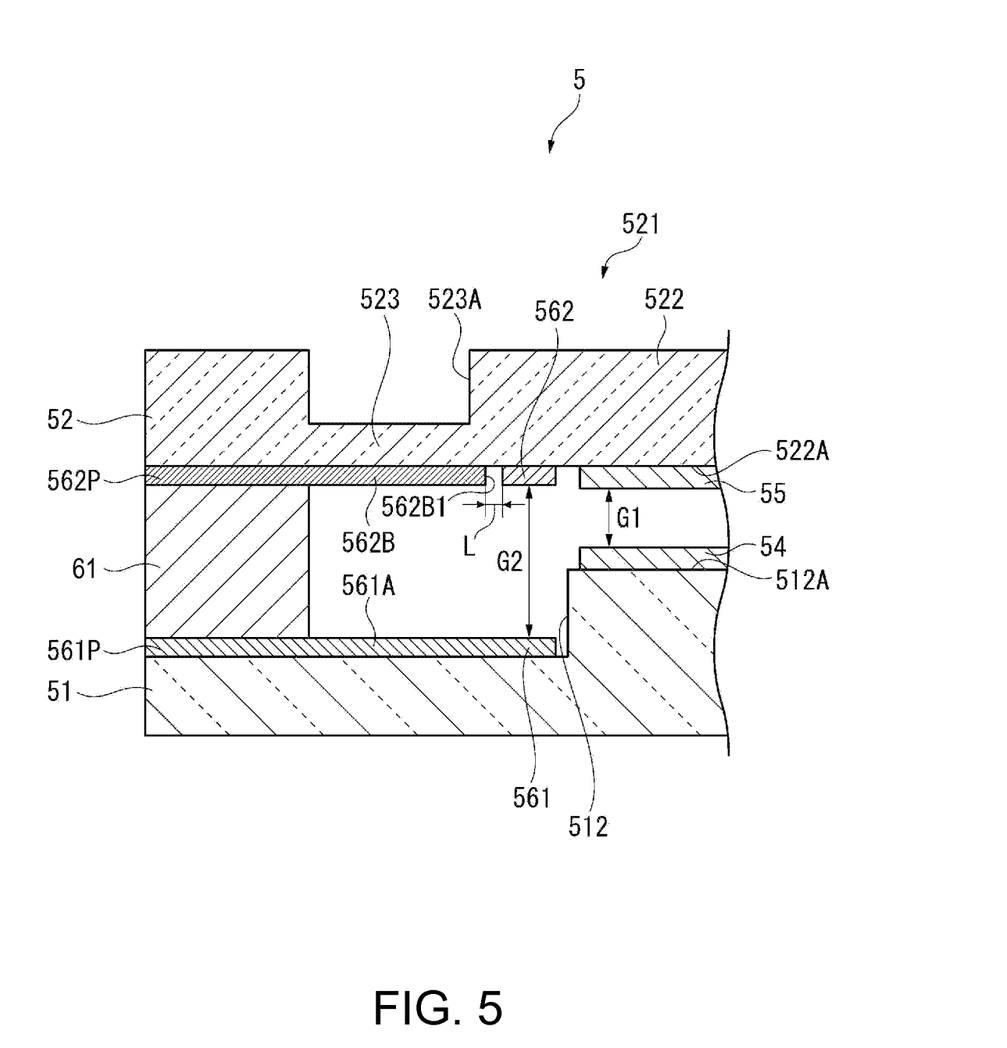
FIG. 5 is a partial cross-sectional view of the etalon of the embodiment.

FIG. 5 is a cross-sectional view along the line V-C shown in FIGS. 2 and 3 and is a partial cross-sectional view of the etalon 5.

As shown in FIG. 5, the first opposite electrode wires 562B are disposed so as to be opposite to the respective first electrode wires 561A. And the first opposite electrode wires 562B are connected to the first electrode wires 561A with first conductive sections 61, respectively, in a conductive manner.

The first conductive sections 61 are each bonded to the first opposite electrode wire 562B and the first electrode wire 561A to thereby electrically connect the first opposite electrode wire 562B and the first electrode wire 561A to each other. The first conductive sections 61 are each made of an electrically conductive material such as Ag paste.

Figure 6:
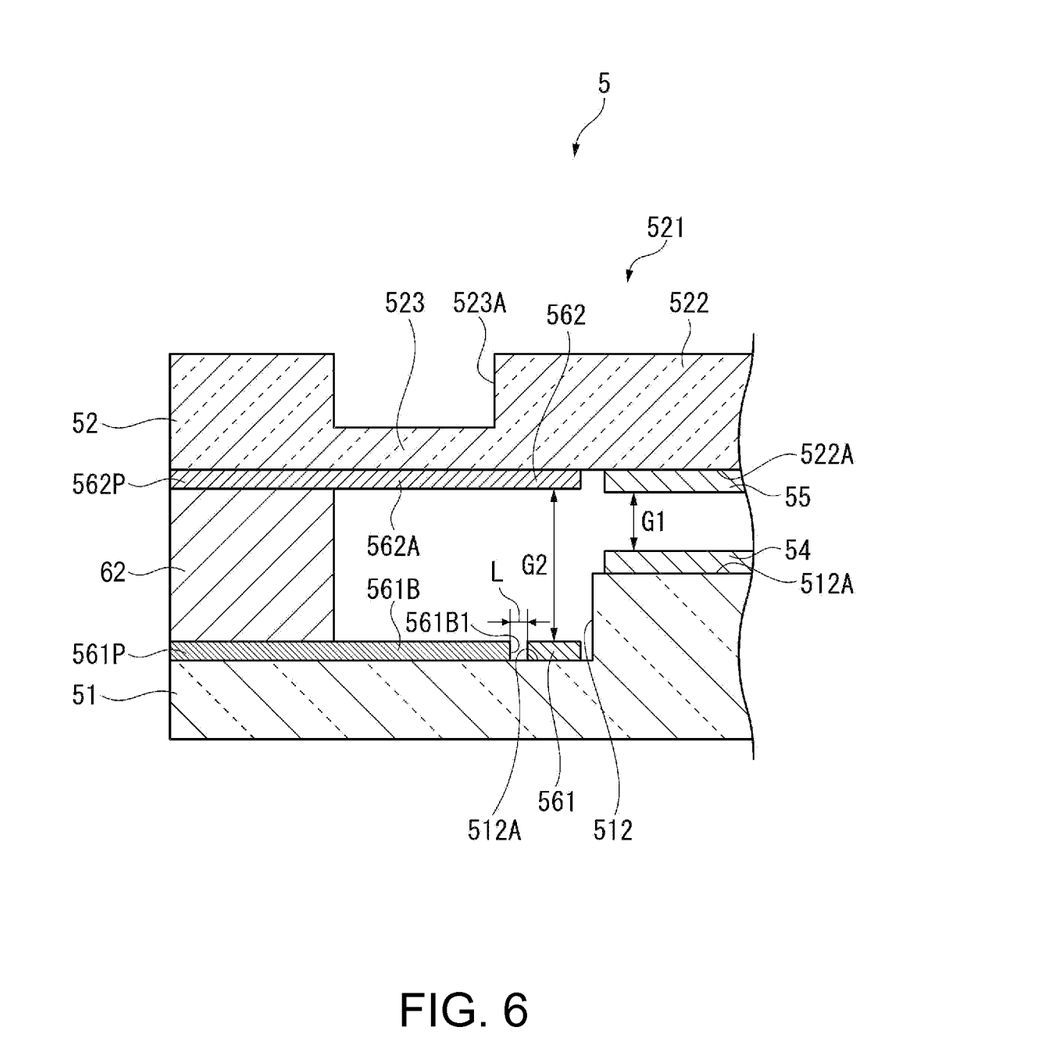
FIG. 6 is a partial cross-sectional view of an etalon of an embodiment.

FIG. 6 is a cross-sectional view along the line VI-C shown in FIGS. 2 and 3 and is a partial cross-sectional view of the etalon 5.

As shown in FIG. 6, the second opposite electrode wire 561B is disposed so as to be opposite to the second electrode wire 562A. And the second opposite electrode wire is connected to the second electrode wire 562A with a second conductive section 62 in a conductive manner.

The second conductive section 62 is bonded to the second opposite electrode wire 561B and the second electrode wire 562A to thereby electrically connect the second opposite electrode wire 561B and the second electrode wire 562A to each other.

It should be noted that the second conductive section 62 is made of the same material as that of the first conductive section 61.

As described above, since the second opposite electrode wire 561B and the second electrode wire 562A are connected to each other in a conductive manner, and further the first opposite electrode wires 562B and the first electrode wires 561A are respectively connected to each other in a conductive manner, the electrical potential difference between the second opposite electrode wire 561B and the second electrode wire 562A, and the electrical potential difference between the first opposite electrode wires 562B and the first electrode wires 561A become zero. In other words, the electrostatic attractive force can be prevented from being generated between the first electrode 561 and the first opposite electrode wires 562B. Thus, the electrostatic attractive force is generated only between the first electrode 561 and the second electrode 562. Further, the electrostatic attractive force can be prevented from being generated between the second electrode 562 and the second opposite electrode wire 561B. Thus, the electrostatic attractive force is generated only between the second electrode 562 and the first electrode 561.

Further, the distance L between one end section 562B1 of the first opposite electrode wire 562B, the one end section 562B1 being the closest to the second electrode 562, and the second electrode 562 (as shown in FIG. 5), and the distance L between one end section 561B1 of the second opposite electrode wire 561B, the one end section 561B1 being the closest to the first electrode 561, and the first electrode 561 (as shown in FIG. 6) are each in a range of about 1 mm. In contrast, since the dimension of the second gap G2 between the electrodes 561, 562 is in a range of about 1 µm through 2 µm. Even in the case in which the electrostatic attractive force is generated between the electrodes 561, 562, no electrostatic attractive force is generated between the first opposite electrode wires 562B and the second electrode 562, or between the second opposite electrode wire 561B and the first electrode 561. It should be noted that in FIGS. 5 and 6, it is arranged that the dimensions of the distance L and the second gap G2 are different from the dimensions described above for the sake of convenience of illustration.

3-2. Configuration of Voltage Control Section

The voltage control section 6 controls the voltages to be applied to the first electrode 561 and the second electrode 562 of the electrostatic actuator 56 based on a control signal input from the control device 4.

4. Configuration of Control Device

The control device 4 controls an overall operation of the colorimetric device 1. As the control device 4, a general-purpose personal computer, a handheld terminal, and a colorimetry-dedicated computer can be used.

Further, as shown in FIG. 1, the control device 4 is configured including a light source control section 41, a colorimetric sensor control section 42, and a colorimetric processing section 43 (an analysis processing section).

The light source control section 41 is connected to the light source device 2. Further, the light source control section 41 outputs a predetermined control signal to the light source device 2 based on a setting input by the user to thereby make the light source device 2 emit white light with predetermined brightness.

The colorimetric sensor control section 42 is connected to the colorimetric sensor 3. Further, the colorimetric sensor control section 42 sets the wavelength of the light to be received by the colorimetric sensor 3 based on the setting input by the user. And then the colorimetric sensor control section 42 outputs the control signal to the colorimetric sensor 3. The control signal is for instructing the detection of the intensity of the received light having the wavelength thus set. Thus, the voltage control section 6 of the colorimetric sensor 3 sets the voltage to be applied to the electrostatic actuator 56 based on the control signal so as to transmit the light having the wavelength desired by the user.

The colorimetric processing section 43 controls the colorimetric sensor control section 42 to vary the inter-mirror gap of the etalon 5 to thereby vary the wavelength of the light transmitted through the etalon 5. Further, the colorimetric processing section 43 obtains the light intensity of the light transmitted through the etalon 5 based on a light reception signal input from the light receiving element 31. Further, the colorimetric processing section 43 calculates the chromaticity of the light reflected by the test object Abased on the intensity of the received light having each of the wavelengths obtained as described above.

5. Functions and Advantages of Embodiment

According to the etalon 5 of the present embodiment described above, the following advantages can be obtained.

According to the present embodiment, the second substrate 52 having the movable section 522 moving back and force toward the first substrate 51 is provided with the second electrode wire 562A disposed so as to extend from the second electrode 562 to the outer circumferential edge of the second substrate 52, and with the first opposite electrode wires 562B disposed so as to be opposite to the first electrode wires 561A, and to be isolated from the second electrode 562. Further, the second electrode wire 562A and the first opposite electrode wires 562B extend in the respective directions that pass through the center point C of the imaginary circle (the second electrode 562) centered on the center point C of the movable section 522 and that divide the imaginary circle at regular angular intervals (at intervals of 90 degrees) in the etalon plan view. Thus, the stress balance of the second substrate 52 is kept even due to the second electrode wire 562A and the first opposite electrode wires 562B. And as described above, the movable section 522 of the second substrate 52 can be prevented from being tilted due to the film stress in the case of depositing only the second electrode wire 562A on the second substrate 52. Thus, the pair of mirrors 54, 55 can be kept parallel to each other.

Further, the first electrode wires 561A and the first opposite electrode wires 562B opposite to each other are electrically connected to each other with the first conductive sections 61, respectively. Thus, since the electrical potential difference between the first electrode wires 561A and the first opposite electrode wires 562B becomes zero, the electrostatic attractive force can be prevented from being generated between the first electrode wires 561A and the first opposite electrode wires 562B. Thus, it is possible to generate the electrostatic attractive force only between the first electrode 561 and the second electrode 562.

Therefore, the pair of mirrors 54, 55 can be kept parallel to each other. Thus, the gap therebetween can accurately be set to the desired gap G1.

Further, the formation areas Ar in which the second electrode wire 562A and the first opposite electrode wires 562B are formed in the connection holding section 523 are formed to have the same shape. Thus, since the stress balance of the connection holding section 523 is kept even in the second substrate 52, the movable section 522 can surely be prevented from being tilted due to the film stress in the case of depositing only the second electrode wire 562A on the connection holding section 523. Thus, the pair of mirrors 54, 55 can be kept parallel to each other.

Further, in the first substrate 51, the first electrode wires 561A and the second opposite electrode wire 561B opposite to the second electrode wire 562A extend in the respective directions that pass through the center point C of the imaginary circle (the first electrode 561) centered on the center point C of the stationary mirror 54 in the etalon plan view and that divide the imaginary circle at regular angular intervals (at intervals of 90 degrees). Thus, the deflection caused in the first substrate 51 by the film stress in the case of depositing only the first electrode wire 561A can be prevented. And the pair of mirrors 54, 55 can be kept more highly parallel to each other.

Further, the second electrode wire 562A and the second opposite electrode wire 561B opposite to each other are electrically connected to each other with the second conductive section 62. Thus, since the electrical potential difference between the second electrode wire 562A and the second opposite electrode wire 561B becomes zero, the electrostatic attractive force can be prevented from being generated between the second electrode wire 562A and the second opposite electrode wire 561B. Thus, it is possible to generate the electrostatic attractive force only between the first electrode 561 and the second electrode 562. Therefore, the pair of mirrors 54, 55 can be kept more highly parallel to each other. As a result, the gap therebetween can accurately be set to the desired gap G1.

Modifications of Embodiment

It should be noted that the invention is not limited to the embodiment described above, but includes modifications and improvements within a range where the advantages of the invention can be achieved.

Figure 7:
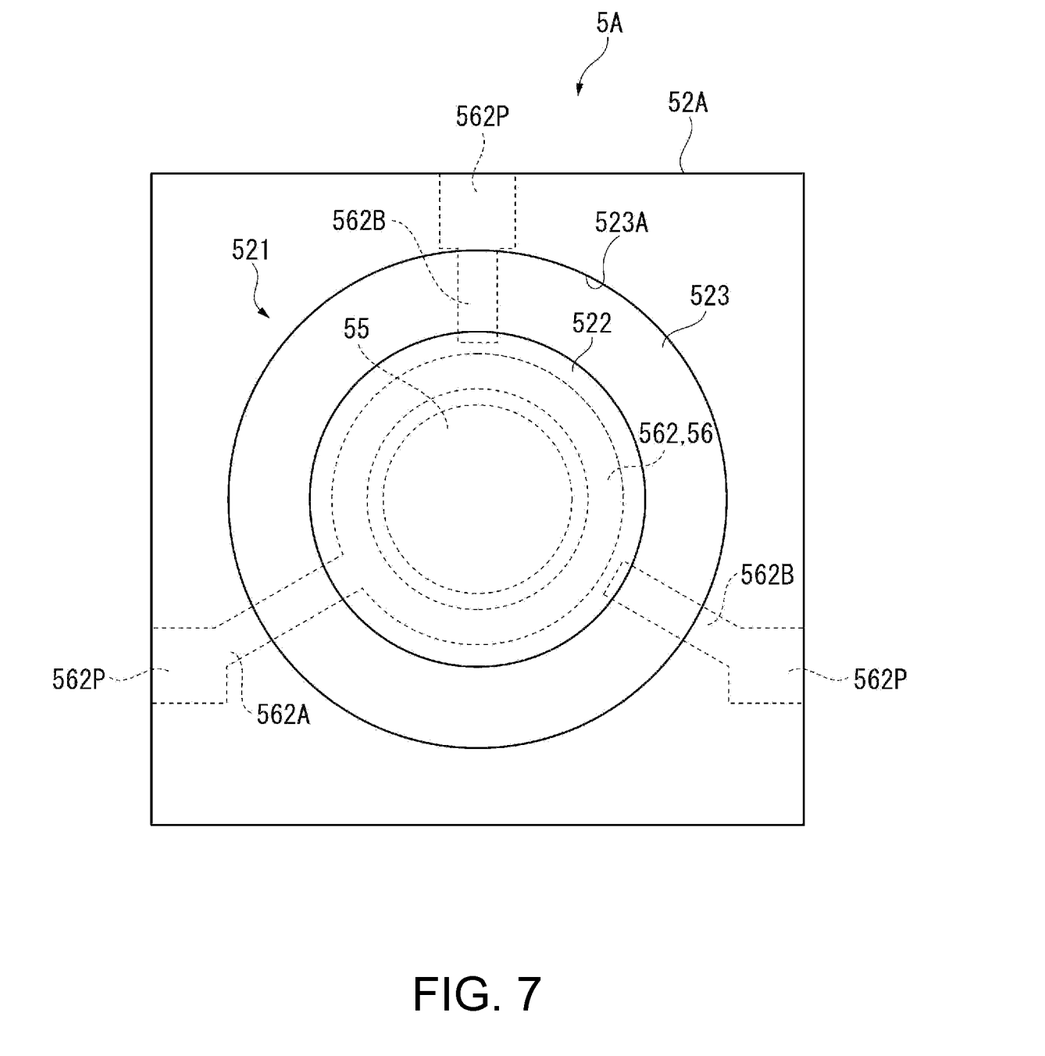
FIG. 7 is a plan view of a second substrate of an etalon of a modified example according to the invention.

FIG. 7 is a plan view of a second substrate 52A of an etalon 5A according to a modified example of the invention.

Although in the embodiment described above the second substrate 52 is provided with the four electrode wires 562A, 562B, the second substrate 52A is provided with three electrode wires 562A, 562B in the present modified example.

Specifically, the second substrate 52A of the etalon 5A is provided with a single second electrode wire 562A formed extending from the second electrode 562 toward the outer circumferential edge of the second substrate 52A and with two first opposite electrode wires 562B formed so as to be isolated from the second electrode 562. Further, the second electrode wire 562A and the first opposite electrode wires 562B are formed at intervals of 120 degrees in the circumferential direction of the imaginary circle centered on the substrate center point in the etalon plan view.

Further, the number of electrode wires is not limited to the number in the embodiment described above or the modified example described above, but it is also possible, for example, that a single second electrode wire and a single first opposite electrode wire are formed passing through the center point of the imaginary circle centered on the center point of the movable section in the etalon plan view in the respective directions dividing the imaginary circle at regular angular intervals.

Although in the embodiment described above the movable surface 522A is provided with the second electrode 562, it is also possible that the second electrode 562 is formed on the surface of the connection holding section 523, the surface being opposite to the first substrate 51.

Although in the embodiment described above the first substrate 51 is provided with the second opposite electrode wire 561B, a configuration without providing the second opposite electrode wire 561B can also be adopted. In this case, it is sufficient to increase the thickness dimension of the first substrate 51 to the extent that the first substrate 51 is not deflected by the film stress caused when depositing the first electrode wires 561A on the first substrate 51.

Although in the embodiment described above the four electrode wires 561A, 561B, 562A, and 562B are formed on the substrates 51, 52, respectively, along the diagonal lines of the respective substrates 51, 52, it is sufficient for the first electrode wires 561A and the second opposite electrode wire 561B, or the second electrode wire 562A and the first opposite electrode wires 562B to be formed so as to be point-symmetric about the center point of the movable section 522 in the etalon plan view.

Although in the embodiment described above it is assumed that the bonding surfaces 513, 524 are bonded to each other with the bonding layer 53, this is not a limitation. It is also possible to adopt the configuration in which the bonding layer 53 is not formed, but bonding is performed by so-called surface activated bonding of activating the bonding surfaces 513, 524 and then pressurizing the bonding surfaces 513, 524 thus activated while overlapping them with each other to thereby perform bonding, and any bonding process can also be adopted.

Although in the embodiment described above the colorimetric sensor 3 is illustrated as an example of the optical module of the invention, and the colorimetric device 1 equipped with the colorimetric sensor 3 is illustrated as an example of the optical analysis device, the invention is not limited thereto. For example, a gas sensor, which makes a gas flow into the inside of the sensor, and then detects the light absorbed by the gas out of the incident light, can also be used as the optical module according to the invention. And further, a gas detection device for analyzing and then discriminating the gas made to flow into the inside of the sensor using such a gas sensor can also be cited as the optical analysis device according to the invention. Further, the optical analysis device can also be a spectroscopic camera, or a spectroscopic analyzer each equipped with such an optical module.

Further, it is also possible to transmit data with the light having each of the wavelengths by temporally varying the intensity of the light having each of the wavelengths. And in this case, it is possible to extract the data transmitted with the light having a specific wavelength by dispersing the light having the specific wavelength using the etalon 5 provided to the optical module, and then making the light receiving section receive the light. Therefore, by processing the data of the light having each of the wavelengths using the optical analysis device equipped with such a data extracting optical module, it is also possible to perform optical communication.

What is claimed is:

1. A wavelength-variable interference filter comprising:
    a first substrate;
    a second substrate that is opposite to the first substrate and that has a movable section moving back and forth with respect to the first substrate;
    a first reflecting film that is provided at a first surface of the first substrate, the first surface being opposite to the second substrate;
    a second reflecting film that is provided at a second surface of the movable section, the second surface being opposite to the first substrate, and the second reflecting film being opposite to the first reflecting film via a predetermined first gap;
    a first electrode that is provided at a third surface of the first substrate the third surface being opposite to the second substrate;
    a second electrode that is provided at a fourth surface of the second substrate, the fourth surface being opposite to the first substrate, and the second electrode being opposite to the first electrode via a predetermined second gap;
    a first electrode wire that is provided at the first substrate so as to extend from the first electrode toward an outer circumferential edge of the first substrate;
    a second electrode wire that is provided at the second substrate so as to extend from the second electrode toward an outer circumferential edge of the second substrate;
    a first opposite electrode wire that is provided at the second substrate, that is opposite the first electrode wire, and that is isolated from the second electrode; and
    a first conductive section adapted to electrically connect the first electrode wire with the first opposite electrode wire,
    wherein the second electrode wire and the first opposite electrode wire extend in respective directions that pass through a center point of an imaginary circle centered on a center point of the movable section in a plan view viewed from a first thickness direction of the second substrate and that divide the imaginary circle at regular angular intervals.

2. The wavelength-variable interference filter according to claim 1, wherein
    the second substrate has a connection holding section adapted to hold the movable section movably in the first thickness direction of the second substrate,
    the second electrode wire and the first opposite electrode wire are partially formed on the connection holding section, and
    formation areas in which the second electrode wire and the first opposite electrode wire are partially formed have substantially the same shapes.

3. The wavelength-variable interference filter according to claim 1, further comprising:
    a second opposite electrode wire that is provided at the first substrate, that is opposite to the second electrode wire, and that is isolated from the first electrode; and
    a second conductive section adapted to electrically connect the second electrode wire with the second opposite electrode wire,
    wherein the first electrode wire and the second opposite electrode wire extend in the respective directions that pass through the center point of the imaginary circle centered on the center point of the first reflecting film in the plan view viewed from a second thickness direction of the first substrate and that divide the imaginary circle at regular angular intervals.

4. An optical module comprising:
    the wavelength-variable interference filter according to claim 1; and
    a light receiving section adapted to receive test target light transmitted through the wavelength-variable interference filter.

5. A colorimetric sensor comprising:
    the wavelength-variable interference filter according to claim 1; and
    a light receiving section adapted to receive test target light transmitted through the wavelength-variable interference filter.

6. A gas sensor comprising:
    the wavelength-variable interference filter according to claim 1;
    a path which makes a gas flow into the inside of the wavelength-variable interference filter; and a light receiving section adapted to receive test target light transmitted through the wavelength-variable interference filter.

7. An optical analysis device comprising:

the optical module according to claim 4; and an analysis processing section adapted to analyze optical characteristics of the test target light based on the light received by the light receiving section of the optical module.

8. A colorimetric device comprising:

the colorimetric sensor according to claim 5; and an analysis processing section adapted to analyze optical characteristics of the test target light based on the light received by the light receiving section of the colorimetric sensor.

9. A gas detection device comprising:

the gas sensor according to claim 6; and an analysis processing section adapted to analyze optical characteristics of the test target light based on the light received by the light receiving section of the optical module.

10. A spectroscopic camera comprising:

the wavelength-variable interference filter according to claim 1; and a light receiving section adapted to receive test target light transmitted through the wavelength-variable interference filter.

11. A spectroscopic analyzer comprising:

the wavelength-variable interference filter according to claim 1; and a light receiving section adapted to receive test target light transmitted through the wavelength-variable interference filter.

12. A wavelength-variable interference filter comprising:

a first electrode that is provided at a first substrate;

a second electrode that is provided at a second substrate including a movable section and that is opposite to the first electrode;

a first electrode wire that is disposed at the first substrate so as to extend from the first electrode toward an outer circumferential edge of the first substrate;

a second electrode wire that is disposed at the second substrate so as to extend from the second electrode toward an outer circumferential edge of the second substrate;

a first opposite electrode wire that is disposed at the second substrate, that is opposite to the first electrode wire, and that is isolated from the second electrode; and a first conductive section adapted to electrically connect the first electrode wire with the first opposite electrode wire, wherein the second electrode wire and the first opposite electrode wire are disposed on respective straight lines that pass through a center point of an imaginary circle centered on a center point of the movable section in a plan view viewed from a thickness direction of the second substrate and that extend in respective directions dividing the imaginary circle at regular angular intervals.

* * * * *